Patented Nov. 23, 1948

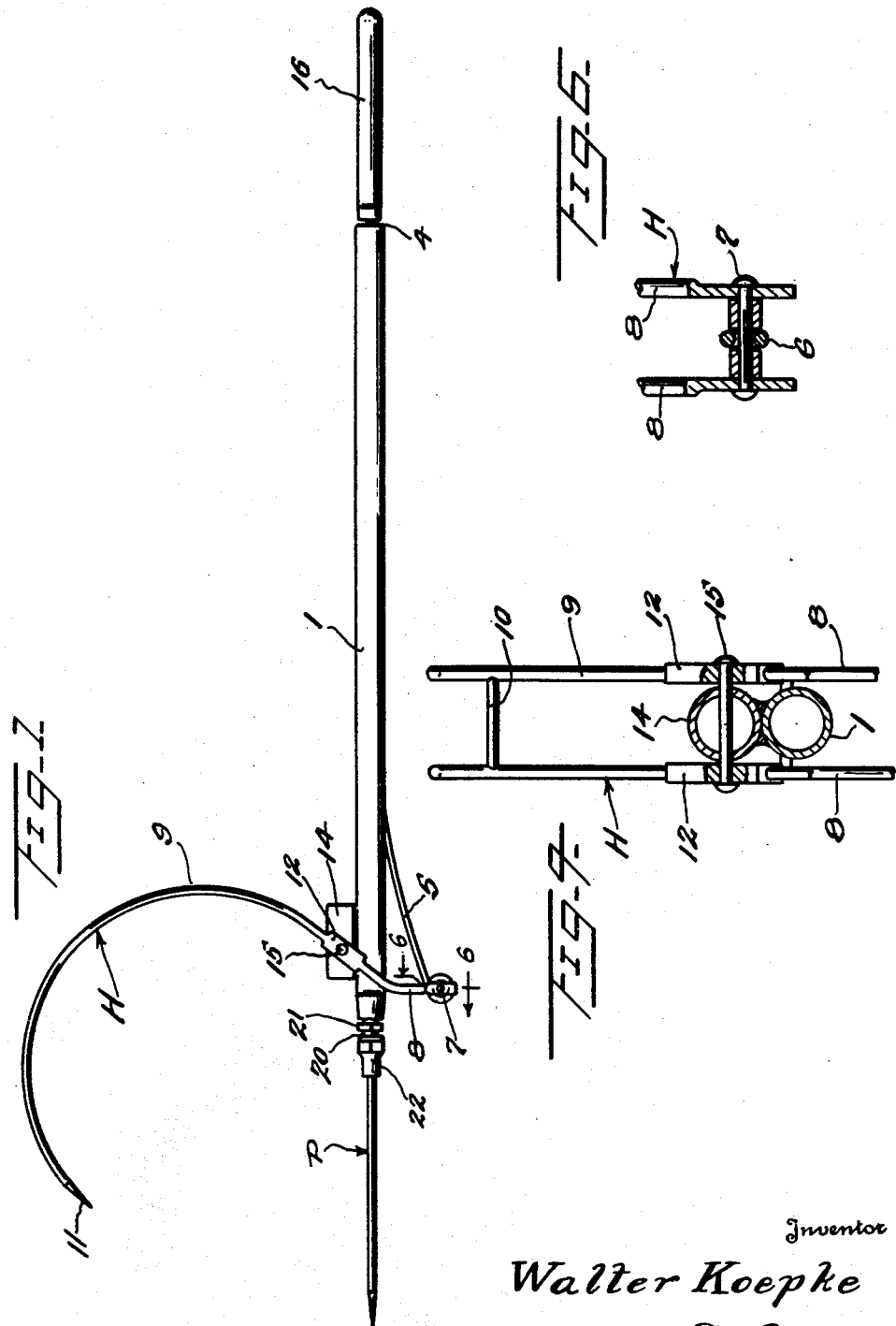

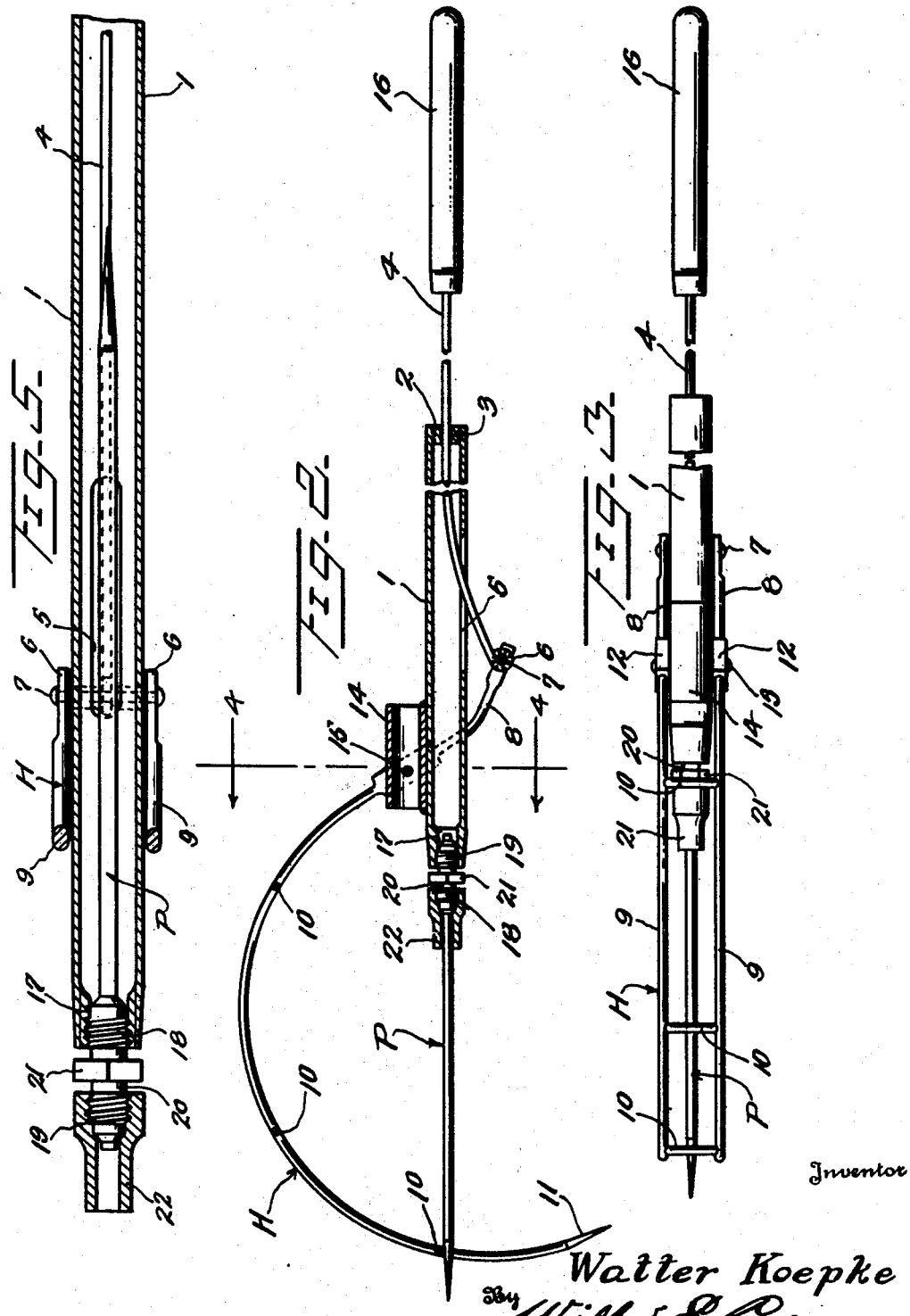

2,454,460

UNITED STATES PATENT OFFICE 2,454,460

FISH GIG

Walter Koepke, Baytown, Tex.

Application January 16, 1945, Serial No. 573,005

2 Claims. (Cl. 43—5)

1

This invention relates to a fish-gig and has relation more particularly to a gig of this kind especially designed and adapted for use in fishing for flounders, and it is an object of the invention to provide a novel and improved gig which can be easily operated by an individual and in a manner to assure effective capture of the fish.

It is also an object of the invention to provide a gig of this kind including a prong and a swinging grapple member coacting with the prong to effect the desired capture of the fish.

The invention consists in the details of construction and in the combination and arrangement of the several parts of my improved fish-gig whereby certain important advantages are attained, as will be hereinafter more fully set forth.

In order that my invention may be the better understood, I will now proceed to describe the same with reference to the accompanying drawings, wherein:

Figure 1 is a view in side elevation of a fish-gig constructed in accordance with an embodiment of the invention, the grapple hook being retracted;

Figure 2 is a view partly in side elevation and partly in longitudinal section of a gig as illustrated in Figure 1, with the grapple hook in closed position;

Figure 3 is a view in top plan of the gig as illustrated in Figure 2;

Figure 4 is an enlarged sectional view substantially on the line 4—4 of Figure 2;

Figure 5 is an enlarged fragmentary view partly in longitudinal section and partly in plan, with the prong in housed position; and Figure 6 is an enlarged detail sectional view taken substantially on the line 6—6 of Figure 1.

In the embodiment of the invention as illustrated in the accompanying drawings, I denotes a relatively long tubular shaft handle of desired dimensions and which has its rear end portion closed by a plug 2 herein disclosed as threaded therein although, of course, the plug 2 may be held in applied position in any manner preferred.

This plug 2 at its axial center is provided therethrough with an opening 3 through which freely passes an elongated flexible rod 4. The inserted end portion of this rod 4 freely passes outwardly of the shaft 1 at the forward portion thereof through a suitably positioned and longitudinally disposed slot 5.

The extended portion of the rod 4 is freely connected, as at 6, with a cross member 7 connecting the tail extensions 8 of the tines 9 of a grapple hook H. These tines 9 are spaced apart a required distance and are arranged side by side and intermediate their ends the tines 9 are held in desired assembly and relation by the intermediate cross members 10 rigidly connected with the tines 9.

As herein embodied, the tines 9 and, of course, the grapple hook H are substantially semicircular in form, with the outer or free extremities of the tines pointed, as at 11. The grapple hook H is also of such dimensions and radius as to closely approach the outer extremity of the prong P when in applied or working position.

The inner portions of the tines 9 of the grapple hook H are flattened, as at 12, and said flattened portions are at opposite sides of but immediately adjacent to an outstanding elongated block 14 welded or otherwise rigidly secured to the tubular handle 1 adjacent the forward or front extremity thereof and disposed lengthwise thereof. Disposed through this block 14, which is herein disclosed as tubular, and the flattened portions 12 is the pintle 15 whereby the grapple hook H is supported for requisite swinging movement.

The rod 4 is of a length to extend at all times beyond the rear end of the tubular handle 1 and said portion beyond the rear of the tubular handle 1 carries a handle 16 to facilitate the desired endwise movement of the rod 4. Endwise movement of the rod 4 results in the grapple hook H being thrown back into fully retracted or open position the extent of the opening being determined by contact of the hand grasp 16 with the rear end of the tubular handle 1 or more particularly the plug 2. Pull upon the rod 4 will result in the grapple hook H being swung into effective working position with respect to the prong P.

The front end portion of the tubular handle 1 has welded or otherwise secured thereto a tubular head or plug 17 into which is adapted to thread either of the end portions 18 and 19 of an elongated but relatively short prong head 20. The intermediate portion of this head 20 is surrounded by an angular flange 21 to provide means to facilitate the threading of either of the portions 18 or 19 of the prong head 20 into the head or plug 17.

Extending from the end of the prong head 20 immediately adjacent to the threaded portion 19 is the prong P which is of predetermined dimensions and when this threaded portion 19 of the prong head 20 is threaded into the head or plug 17, the prong P will be housed within the adjacent portion of the tubular handle 1. When the portion 18 of the head 20 is threaded into the head or plug 17, the prong P will be outwardly disposed with respect to the tubular handle 1 and in working assembly.

When the portion 19 of the head 20 is engaged within the head or plug 17, it is desirable to engage with the outwardly disposed threaded portion 18 a protecting cap 22 which is in the nature of an elongated sleeve open at both ends. When the threaded portion 18 of the head 20 is threaded within the head or plug 17, this cap 22 is preferably engaged with the outwardly disposed threaded portion 19 to protect the same. The bore of the cap or sleeve 22 is of sufficient diameter to readily permit the same to be applied over the prong P.

From the foregoing description it is thought to be obvious that a fish-gig constructed in accordance with my invention is particularly well adapted for use by reason of the convenience and facility with which it may be assembled and operated.

I claim:

1. A fish gig of the character stated comprising a relatively long handle member, a hook consisting of a pair of spaced parallel arcuate members having transversely extending cross members connected therebetween, the arcuate members at one end of the hook being pointed and at the opposite end being in straddling relation with an end of the handle, a pivot pin extending between the members at said opposite end of the hook and transversely of and connected with said handle, means carried by the handle and connected with said other end of the hook for effecting the oscillation of the hook, the pointed ends of the members making up the hook being movable across and in spaced relation with the said one end of the handle, and a prong carried by the said end of the handle and extending longitudinally therefrom, the prong being of a length to extend beyond the radius of the hook when the hook is oscillated to a position to extend across said end of the handle, the pointed members of the hook straddling the prong.

2. A fish gig of the character stated in claim 1 wherein one of the said cross members between the spaced members of the hook is positioned to engage the prong and limit the swinging movement of the pointed ends of the hook members across the prong.

WALTER KOEPKE.

REFERENCES CITED

The following references are of record in the file of this patent:

UNITED STATES PATENTS

| Number | Name | Date |
|---|---|---|
| 70,261 | Quail | Oct. 29, 1867 |
| 634,732 | Ivory | Oct. 10, 1899 |
| 849,481 | Lobit | Apr. 9, 1907 |
| 917,634 | Melby | Apr. 6, 1909 |
| 1,082,547 | Nuttall | Dec. 30, 1913 |
| 1,376,335 | Hentschel | Apr. 26, 1921 |
| 1,783,346 | Scully | Dec. 2, 1930 |
| 2,029,155 | Cervenka et al. | Jan. 28, 1936 |
| 2,110,999 | Miga | Mar. 15, 1938 |

FOREIGN PATENTS

| Number | Country | Date |
|---|---|---|
| 403,769 | Great Britain | Jan. 4, 1934 |